United States Patent [19]

Miller et al.

[11] Patent Number: 5,754,855
[45] Date of Patent: May 19, 1998

[54] SYSTEM AND METHOD FOR MANAGING CONTROL FLOW OF COMPUTER PROGRAMS EXECUTING IN A COMPUTER SYSTEM

[75] Inventors: Stephen Sherman Miller, San Jose, Calif.; Timothy William Osborn, Belleview, Wash.; Robert Milton Smith, II, Morgan Hill; Michael Thomas Wheatley, San Jose, both of Calif.

[73] Assignee: International Business Machines Corporation, Armonk, N.Y.

[21] Appl. No.: 854,363

[22] Filed: May 12, 1997

Related U.S. Application Data

[63] Continuation of Ser. No. 507,068, Jul. 26, 1995, abandoned, which is a continuation of Ser. No. 230,756, Apr. 21, 1994, abandoned.

[51] Int. Cl.$^6$ ................................ G06F 9/00; G06F 13/00
[52] U.S. Cl. .......................... 395/676; 395/671; 395/672; 364/281.3; 364/286
[58] Field of Search .................................... 395/671, 672, 395/676; 364/281.3, 286

[56] References Cited

U.S. PATENT DOCUMENTS

| | | | |
|---|---|---|---|
| 5,097,533 | 3/1992 | Burger et al. | 395/500 |
| 5,206,951 | 4/1993 | Khoyi et al. | 395/650 |
| 5,237,684 | 8/1993 | Record et al. | 395/650 |
| 5,305,454 | 4/1994 | Record et al. | 395/650 |
| 5,327,558 | 7/1994 | Burke et al. | 395/650 |
| 5,339,421 | 8/1994 | Housel, III | 395/700 |
| 5,339,430 | 8/1994 | Lundin et al. | 395/700 |
| 5,446,899 | 8/1995 | Brett | 395/700 |
| 5,455,949 | 10/1995 | Conder et al. | 395/700 |

*Primary Examiner*—Robert B. Harrell
*Assistant Examiner*—Saleh Najjar
*Attorney, Agent, or Firm*—Marilyn Smith Dawkins, Esq.; Sterne, Kessler, Goldstein & Fox, P.L.L.C.

[57] ABSTRACT

Processing an event signifying a condition in a computer system is described. The computer system maintains an invocation stack which includes a plurality of stack frames. Such event processing operates by selecting a stack frame from the invocation stack, and then determining whether a user specified event processing procedure capable of processing the event has been registered with the selected stack frame. If a user specified event processing procedure has been so registered, then the event is processed using the user specified event processing procedure as specified by a set of rules and options defined for the disposition and/or processing of the specific event. Optionally, it is then determined whether a language specific event processing procedure capable of processing the event has been registered with the selected stack frame. If a language specific event processing procedure has been so registered, then the event is processed using the language specific event processing procedure as specified by a set of rules and options defined for the disposition and/or processing of the specific event. If an user specified event processing procedure capable of processing the event or a language specific event processing procedure capable of processing the event has not been registered with any stack frame of the invocation stack or have chosen not to terminate the event processing, then the event is processed using an applicable default event processing procedure.

25 Claims, 5 Drawing Sheets

SYSTEM AND METHOD FOR MANAGING CONTROL FLOW OF COMPUTER PROGRAMS EXECUTING IN A COMPUTER SYSTEM

This application is a continuation of U.S. application Ser. No. 08/507,068, filed Jul. 26, 1995 now abandoned, which is a continuation of U.S. application Ser. No. 08/230,756, filed Apr. 21, 1994 now abandoned.

TECHNICAL FIELD

The present invention relates to systems and methods for managing control flow among code segments of a computer program executing in a computer system.

BACKGROUND ART

In order to achieve maximum programming function and flexibility, it is desirable to provide software programmers with the ability to create software application programs from code segments (also called software modules and software routines, for example) which are written in diverse computer languages (such as C, COBOL, PL/I, C++, etc.) and diverse programming paradigms (such as procedural and object oriented). For example, one such application program might have one code segment written in C++ (which is an object oriented language) and two other code segments written in COBOL and PL/I, respectively (which are both procedural languages).

The code segments contained in a single application program that is executing in a computer system must interact in a predictable and robust manner. For example, jump operations (also called "transfer of control" operations) that cause control to flow from one code segment to another code segment must be implemented in a predictable and robust manner. Also, termination of one or more code segments of an application program must be handled in a predictable and robust manner. Further, conditions (also called exceptions and errors) must be processed in a predictable and robust manner.

However, conventional computer systems provide no mechanism for coordinating the interaction of computer language and programming paradigm diverse code segments. For example, diverse computer programming languages may specify different procedures for implementing jump operations. In this case, there is uncertainty as to which procedure should be used to implement jump operations.

Also, a first and a second computer programming language may define different condition handlers for processing a particular condition, while a third programming language may be silent as to how to process the condition (in fact, this third programming language may not even recognize the condition). In this case, these is uncertainty as to whether the condition should be processed at all, and if it should be processed, then how the condition should be processed. Thus, the run-time behavior of application programs is neither predictable nor robust in conventional computer systems wherein no mechanism is provided for coordinating the interaction of computer language and programming paradigm diverse code segments.

Thus, what is required is a system and method for coordinating the interaction of computer language and programming paradigm diverse code segments such that the run-time behavior of application programs is predictable and robust.

DISCLOSURE OF INVENTION

The present invention provides a mechanism by which events resulting from program execution may be processed in a common manner across programming languages, applications, and application development tools. Consequently, the present invention provides a means by which more reliable, predictable, and robust applications may be built utilizing heterogeneous blocks of code.

More particularly, the present invention is a system and method for processing an event signifying an activity in a computer system, wherein an invocation stack is maintained in the computer system. The invocation stack includes a plurality of stack frames.

The present invention operates by selecting a stack frame from the invocation stack, and then determining whether a user specified event processing procedure capable of processing the event has been registered with the selected stack frame. If a user specified event processing procedure has been so registered, then the event is processed using the user specified event processing procedure, in accordance with a specific set of rules and options defined by this invention.

Otherwise, the present invention determines whether a language specific event processing procedure capable of processing the event has been registered with the selected stack frame. If a language specific event processing procedure has been so registered, then the event is processed using the language specific event processing procedure, in accordance with a specific set of rules and options defined by the language.

If an user specified event processing procedure capable of processing the event or a language specific event processing procedure capable of processing the event has not been registered with any stack frame of the invocation stack, or have been registered but have chosen not to process the event, then the event is processed using an applicable default event processing procedure, in accordance with a specific set of rules and options defined by this invention.

The present invention provides a number of advantages. For example, in support of heterogeneous applications, the environment provided by the present invention provides a set of functional models, callable services to manipulate these models, and default mechanisms that provide predictable semantics for the cooperative execution of code compiled with compilers that have been extended to specifically support these functions (such compilers are referred to as being "enabled"), and those not extended (i.e., not enabled).

In support of object oriented programming, the environment provided by the present invention supports the building of applications with a mix of code blocks written in both object oriented and non-object oriented languages.

Consequently, the present invention provides the application writer with an environment in which the following benefits are realized: (1) the ability to write new applications in combinations of traditional procedural languages and object oriented methods; (2) the ability to smoothly migrate existing procedural based code into the object oriented programming world, with minimal disruption; and (3) the ability to provide consistent predictable semantics from the constructed application when the defined protocols are observed regardless of the enablement status of the compiler being used.

The foregoing and other objects, features and advantages of the invention will be apparent from the following more particular description of preferred embodiments of the invention, as illustrated in the accompanying drawings.

BRIEF DESCRIPTION OF THE DRAWINGS

The present invention will be described with reference to the accompanying drawings, wherein.

BEST MODE FOR CARRYING OUT THE INVENTION

1. Overview of the Present Invention

The present invention is directed to a system and method for coordinating the interaction of code segments such that the run-time behavior of application programs containing those code segments is predictable and robust. Such code segments may be computer language diverse and/or programming paradigm diverse, and are called "computer language and/or programming paradigm diverse code segments". That is, such code segments are written in diverse computer languages and/or diverse programming paradigms. It should be understood, however, that the present invention operates equally well with code segments that are written using the same computer programming language and the same programming paradigm. The terms "code segment", "software module", "software function", and "software routine" are used interchangeably herein.

By coordinating such interaction among computer language and/or programming paradigm diverse code segments in a predetermined manner, the present invention ensures predictable and robust run-time behavior of application programs.

Figure 1:
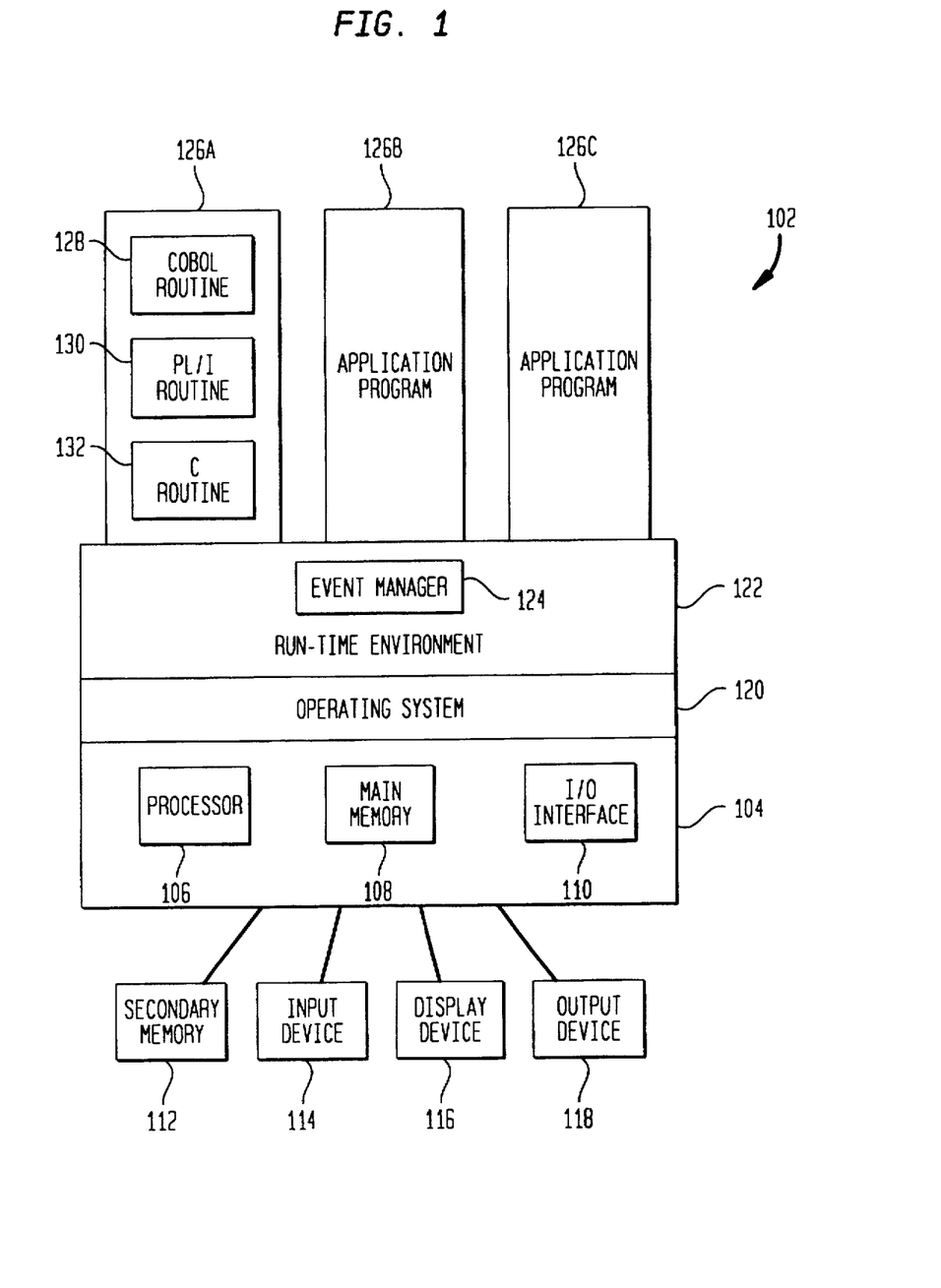
FIG. 1 is a block diagram of a computer system according to an embodiment of the present invention.

FIG. 1 is a block diagram of a computer system 102 according to an embodiment of the present invention. The computer system 102 includes hardware components 104, such as one or more processors 106, a main memory 108 (preferably implemented using random access memory, RAM), and an input/output (I/O) interface 110. The main memory 108 is used to store, for example, invocation stacks (discussed below) associated with executing application programs.

A number of peripheral devices are connected to the hardware components 104, such as one or more secondary storage devices 112 (such as a hard drive), one or more input devices 114 (such as keyboards and pointing devices), one or more display devices 116 (such as monitors), and one or more output devices 118 (such as printers and network adapters).

The computer system 102 also includes an operating system 120 and a run-time environment 122 which represents a layer between the operating system 120 and application programs 126 (described below) which execute in the computer system 102. Generally, application programs 126 access services provided by the operating system 120 via the run-time environment 122. In other words, the run-time environment 122 represents an interface to the operating system 120.

As just indicated, application programs 126 execute in computer system 102. Preferably, application programs 126 execute in parallel with respect to each other, but may alternatively execute serially. Each application program 126 may include a plurality of software routines (that is, code segments) which are written in diverse computer languages and/or diverse programming paradigms. In other words, each application program 126 may include a plurality of computer language and/or programming paradigm diverse code segments. For example, application program 126A includes a software routine 128 that is written in COBOL, a software routine 130 that is written in PL/I, and a software routine 132 that is written in C.

As noted above, the computer system 102 includes a run-time environment 122 which represents a layer between the operating system 120 and application programs 126. The run-time environment 122 includes an event manager 124. Preferably, the event manager 124 implements the method of the present invention.

Specifically, the event manager 122 during run-time coordinates the interaction of software routines in application programs 126 such that the run-time behavior of application programs 126 containing those software routines is predictable and robust. As discussed in detail below, such coordination performed by the event manager 122 includes managing control flow among the software routines. That is, the event manager 122 manages how control is transferred among software routines in each of the application programs 126 executing in the computer system 102.

The event manager 124 can be implemented in any number of ways. For example, as shown in FIG. 1, the event manager 124 can be implemented as a part of the run-time environment 122. Alternatively, the event manager 124 can be implemented as an extension of the operating system 120 (in which case the event manager 124 would be part of the operating system 120). Alternatively, the event manager 124 can be implemented as an extension of a combination of the operating system 120 and the run-time environment 122. The event manager 124 could also be implemented as an application program which executes in the computer system 102, such as application program 126C. These and other implementations of the event manager 124 will be apparent to persons skilled in the relevant art based on the description of the event manager 124 contained herein.

A computer program product comprising a computer readable media having computer program logic recorded thereon, wherein the computer program logic when executed in the computer system 102 enables the computer system 102 to implement the present invention, may be read by and stored in secondary memory 112 (or may be stored in some other type of storage device, such as a floppy disk, and then transferred to the secondary memory 112 or transferred directly to the main memory 108). The computer program logic may then be loaded into main memory 108, and executed by the processor 106 of the computer system 102. When executing in the processor 106, the computer program logic is represented by the event manager 124.

The system of the present invention is represented by the computer system 102 having the event manager 124.

Alternatively, the system of the present invention is represented by the event manager 124 alone. Or, the system of the present invention is represented by the computer program product. Other representations of the present invention will be apparent to persons skilled in the relevant art based on the discussion contained herein.

Preferably, the computer system 102 is the well known PS2 family of computers produced by International Business Machines (IBM) Corporation of Armonk, N.Y. The operating system 120 is preferably the well known OS2 operating system produced by IBM. However, it should be understood that other computers, run-time environments, and/or operating systems could alternatively be used in the computer system 102 without departing from the scope and spirit of the present invention. PS2 and OS2 are registered trademarks of International Business Machines Corporation.

2. Brief Description of Invocation Stacks

Before proceeding further, it will be useful to briefly describe invocation stacks. Invocation stacks are generally well known, and thus the following discussion is provided for the convenience of the reader.

Computer systems support various types of program execution constructs. Two such program execution constructs are processes and threads. Processes and threads are well known. A process is defined as including an address space, one or more threads that execute within that address space, and the system resources required by the threads. An application program includes one or more processes. A thread is defined as being a single flow of control within a process. Each thread has its own required resources to support its flow of control. A thread includes one or more executing routines.

Processes and threads are supported by, for example, the Portable Operating System Interface (POSIX) standard. POSIX, which is a UNIX based operating system interface standard, is described in many publicly available documents, such as *Information Technology-Portable Operating System Interface (POSIX)-Part 1: System Application Program Interface (API) (C Language)*, published by the Institute of Electrical and Electronics Engineers, International Standard ISO/IEC 9945-1:1990, IEEE Standard 1003.1-1990, 1990, and *Draft Standard for Information Technology-Portable Operating System Interface (POSIX)*-Part 1: *System Application Program Interface (API)*-Amendment 2: *Threads Extension (C Language)*, published by the Institute of Electrical and Electronics Engineers, IEEE Standard P1003.4a/D8, 1993.

An invocation stack is a last-in-first-out (LIFO) stack (which may be implemented as a linked list). The elements of an invocation stack are called stack frames Each thread of an application program is associated with an invocation stack. Each routine of a thread is associated with a stack frame in the invocation stack.

Figure 2:
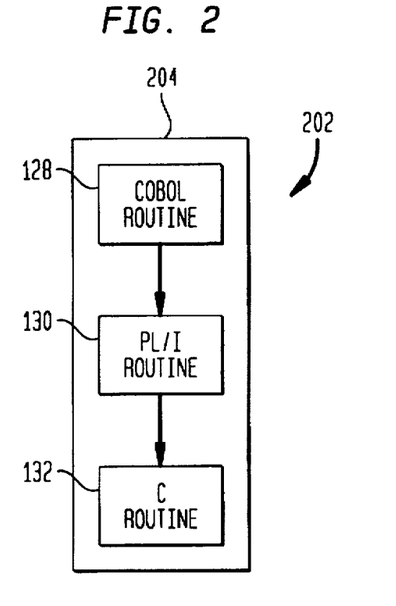
FIG. 2 is an example routine invocation sequence used to describe the present invention.

For example, FIG. 2 is a routine invocation sequence 202 of a thread 204 of the application program 126A (shown in FIG. 1). As shown in this routine invocation sequence 202, the COBOL routine 128 has invoked the PL/I routine 130, and the PL/I routine 130 has invoked the C routine 132.

Figure 3:
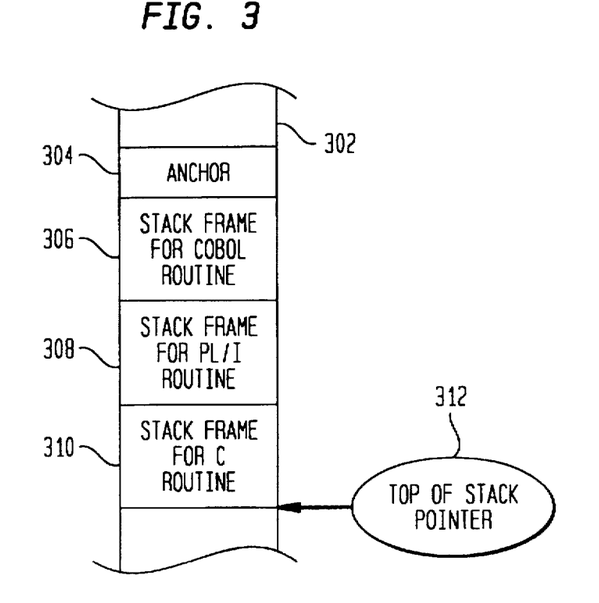
FIG. 3 is an invocation stack corresponding to the function invocation sequence of FIG. 2.

FIG. 3 illustrates an invocation stack 302 which corresponds to the invocation sequence 202 of FIG. 2. The invocation stack 302 includes stack frames 304, 306, 308, and 310. Stack frame 304 is an "anchor" stack frame which operates to denote the beginning of the invocation stack 302. Stack frame 306 is associated with the COBOL routine 128, stack frame 308 is associated with the PL/I routine 130, and stack frame 310 is associated with the C routine 132. Stack frame 310 is at the top of the invocation stack 302, as indicated by a stack pointer 312.

A stack frame is added to an invocation stack when a function is invoked. Similarly, a stack frame associated with a function is removed from the invocation stack when the function returns to its caller. For example, when the C routine 132 returns to the PL/I routine 130, the stack frame 310 associated with the C routine 132 is "popped" (or removed) from the invocation stack 302, and the stack pointer 312 is adjusted to point to the stack frame 308 associated with the PL/I routine 130 (thus, this stack frame 308 becomes the top of the invocation stack 302).

A routine may among other things use its stack frame to store its dynamic variables. Also, when one routine (referred to as the "calling" routine) calls another routine (referred to as the "called" routine), the state of the calling routine is stored in the calling routine's stack frame.

3. Representing Events Using Event Tokens

Events signify conditions or activities in a computer system and are generated by hardware or software. For example, an event may be generated in a computer system when an attempt is made to perform a division operation where the divisor is equal to zero. This event signifies that an illegal division operation (that is, an illegal "divide by zero" operation) has been attempted in the computer system. In other words, this event informs (or "signals") the entity that detects the event that an illegal division operation has been attempted.

There are many categories of events, such as control flow management events. Control flow management events include the following types of events: (a) termination events; (b) transfer of control events (also called control flow events); (c) synchronous condition events; and (d) asynchronous condition events.

A termination event is used to signal the termination of a routine (or set of routines) in an invocation stack. The event is generated by (or "spawned" by) enabled language compilers (that is, language compilers which are executing in the computer system 102) that have been extended or modified to interact with this invention, callable services provided for source code enabled languages, or as the result of other event processing.

There are various types of transfer of control events, such as perform jump events and perform throw events. A perform jump event is used to initiate an unconditional transfer of control within a thread as defined by Kernighan and Ritchie in *The C Programming Language* (1988). This event is spawned by enabled language compilers, enabled language run-times, or callable services (macros). A perform throw event is used to initiate a conditional transfer of control within a thread, as defined by Stroustrop in his book *The C++ Programming Language* (1991), and is spawned by enabled language compilers, enabled language run-times, or callable services (macros).

A synchronous condition event is used to indicate the occurrence of a synchronous condition (also called signal) within a thread. Synchronous signals are described below. This event may be spawned by the system exception handler or callable services.

A synchronous signal is an indication of the occurrence of an event whose origin can be attributed to a specific thread (this is called the originating thread), wherein the originating thread and the receiving thread (that is, the thread which received the signal from the originating thread) execute synchronously with respect to processing the signal. In other words, with synchronous signals, the execution of the originating thread is suspended while the receiving thread is processing the signal.

An asynchronous condition event is used to signal the occurrence of an asynchronous condition (also called signal) to a thread. Asynchronous signals are described below. This event may be spawned by the system exception handler or callable services.

An asynchronous signal is one whose origin can be attributed to a specific thread (this is called the originating thread), wherein the originating thread and the receiving thread (that is, the thread which received the signal from the originating thread) execute in parallel with respect to processing the signal. In particular, the execution of the originating thread is not suspended while the receiving thread is processing the signal. Instead, with asynchronous signals, the originating thread and the receiving thread execute in parallel while the receiving thread is processing the signal.

It is often necessary for a thread's routines to exchange among themselves event-related information. For example, suppose a routine detects a synchronous condition event. This routine may or may not be capable of processing this event. In either case, the routine may find it desirable (and it may be desirable from a system efficiency and effectiveness standpoint) to communicate this event to other routines to determine if any of these other routines are better qualified to process the event. To do this, a mechanism for communicating event-related information among a thread's routines is necessary.

In the case where a thread's routines are computer language and/or programming paradigm diverse, such communication of event-related information is not conventionally possible. As discussed above, conventional computer systems provide no mechanism for coordinating the interaction of computer language and/or programming paradigm diverse routines. In particular, conventional computer systems provide no mechanism for communicating event-related information among computer language and/or programming paradigm diverse routine.

Also, different computer programming languages and different programming paradigms recognize different events and different event formats. Thus, even if a mechanism for communicating event-related information among computer language and/or programming paradigm diverse routines existed, such event-related information would likely be unintelligible to the routines receiving the event-related information.

The inventors have solved this problem by defining an "event token" to represent events. All application programs 126 and the functions which make up the application programs 126 are required to conform to the syntax associated with event tokens (as described below). More particularly, computer programmers are required to generate application programs 126 and the functions which make up the application programs 126 consistent with the syntax associated with event tokens through the use of callable services or native language syntax as provided by enabled compilers. By complying with this syntax associated with event tokens, it is possible for a thread's routines to intelligibly communicate among themselves event-related information, even when the routines are computer language and/or programming paradigm diverse.

Figure 4A:
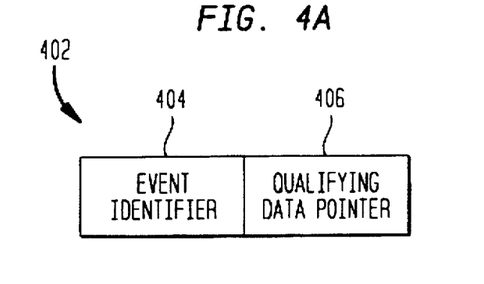
FIGS. 4A and 4B are block diagrams showing the format of an event token.

FIG. 4A illustrates the format of an event token 402. The event token 402 includes an event identifier field 404 (hereafter called event identifier 404 for simplicity) and a qualifying data pointer field 406 (hereafter called qualifying data pointer 406 for simplicity). Preferably, the event identifier 404 is four bytes and the qualifying data pointer 406 is four bytes (such that the event token 402 is eight bytes), although other sizes may be used depending on the particular implementation.

Figure 4B:
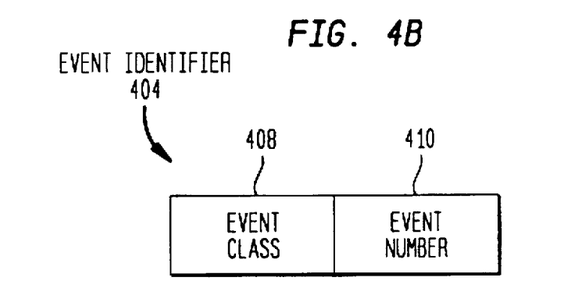

The event identifier 404 contains information which identifies the event that is represented by the event token 402. As shown in FIG. 4B, the event identifier 404 has an event class field 408 (hereafter called event class 408 for simplicity) and an event number field 410 (hereafter called event number 410 for simplicity). The event class 408 is preferably two bytes and the event number 410 is preferably two bytes.

The event class 408 includes information which identifies the type (or class) of the event which the event token 402 represents. For example, as discussed above, there are many types of events, such as termination events, transfer of control events, synchronous condition events, and asynchronous condition events. The event class 408 includes information which identifies whether the event that is being represented is a termination event, a transfer of control event, a synchronous condition event, an asynchronous condition event, or some other type of event.

The event number 410 includes information which more particularly identifies the type of the event which the event token 402 represents. As just discussed, there are many types of events, such as termination events, transfer of control events, synchronous condition events, and asynchronous condition events. Each of these events is further classified into "sub-events". For example, there are a number of synchronous condition sub-events, wherein each of these synchronous condition sub-events corresponds to a different synchronous condition. If the event class 408 of an event token 402 specifies that an event being represented is a synchronous condition event, then the event number 410 further defines the event as one of the synchronous condition sub-events.

Referring again to FIG. 4A, the qualifying data pointer 406 is a pointer (or an address) to a data block (in the main memory 108, for example) that contains information (called qualifying information) pertaining to the specific occurrence of the event represented by the event token 402. This qualifying information varies in type and format by event type (as identified by the event identifier 404), and is unique to each occurrence of a given event. For example, qualifying information pertaining to a specific occurrence of a synchronous condition event (such as the instruction that was being processed when the event was detected) may be stored in the data block addressed by the qualifying data pointer 406.

When a routine detects an event, the routine generates an event token by calling an "event token generating function" provided by the run-time environment 122 (specifically, by the event manager 124). Preferably, the routine passes to the event token generating function any information necessary to create the event token, such as the event type and qualifying information. The event token generating function returns to the routine the newly generated event token. Then, the routine calls an "event token transfer function" provided by the run-time environment 122 (specifically, by the event manager 124) to transfer this event token to the event manager 124 for processing. This sequence of operations is further discussed below.

4. Model for Processing Events

Figure 5:
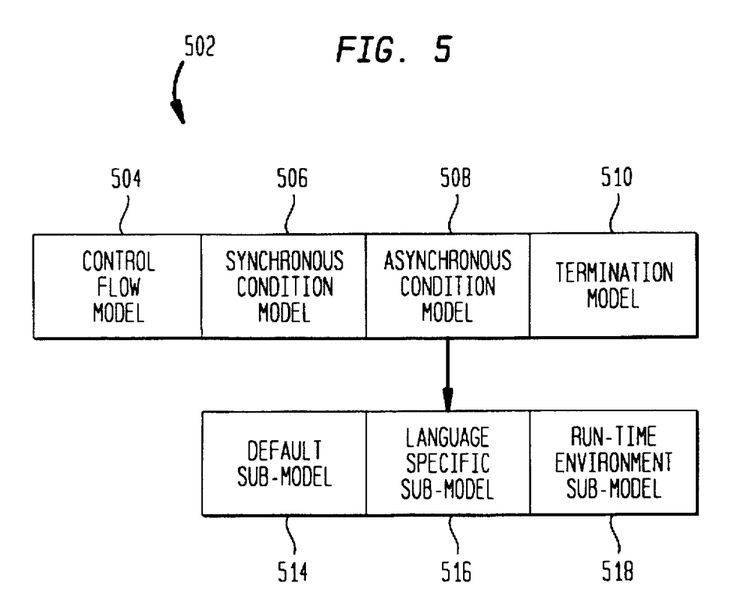
FIG. 5 is a model for processing events according to a preferred embodiment of the present invention.

FIG. 5 is a preferred model 502 for processing events such that the run-time behavior of application programs is predictable and robust. As discussed in a subsequent section, this model 502 is implemented by the event manager 124 of the present invention.

The model 502 includes a primary model 504, 506, 508, 510 for each type of event. As discussed above, there are at least four types of events: (a) termination events; (b) transfer of control events (also called control flow events); (c) synchronous condition events; and (d) asynchronous condition events. Thus, the model 502 includes the following primary models: (a) a termination model 510 which is used to process termination events; (b) a control flow model 504 that is used to process control flow events; (c) a synchronous condition model 506 that is used to process synchronous condition events; and (d) an asynchronous condition model 508 that is used to process asynchronous condition events.

Although the present invention is described herein with respect to four types of events (i.e., termination events, control flow events, synchronous condition events, and asynchronous condition events), it should be understood that the present invention is adapted and intended to operate with and process other types of events. Processing of such other types of events would be performed in accordance with a primary model, such as the termination model 510, control flow model 504, synchronous condition model 506, and asynchronous condition model 508. The structure and operation of primary models for such other types of events would be apparent to a person skilled in the relevant art based on the discussion contained herein.

Each primary model 504, 506, 508, 510 includes a default sub-model 514, a language specific sub-model 516, and a run-time environment sub-model 518. For simplicity purposes, only the sub-models 514, 516, 518 associated with the asynchronous condition model 508 are shown in FIG. 5. While each primary model 504, 506, 508, 510 includes a default sub-model 514, the default sub-models 514 are different for different primary models 504, 506, 508, 510. Similarly, the language specific sub-models 516 and the run-time environment sub-models 518 are different for different primary models 504, 506, 508, 510.

The default sub-model 514, language specific sub-model 516, and run-time environment sub-model 518 specify procedures for processing events. A particular procedure from either the default sub-model 514, the language specific sub-model 516, or the run-time environment sub-model 518 is used to process each event. For example, to process a termination-type event, a particular procedure from either the default sub-model 514, the language specific sub-model 516, or the run-time environment sub-model 518 associated with the termination model 510 is used. The default sub-model 514, language specific sub-model 516, and run-time environment sub-model 518 shall now be described in greater detail.

The run-time environment sub-model 518 for each primary model 504, 506, 508, and 510 specifies user-defined event processing procedures. Specifically, the run-time environment sub-model 518 for the termination model 510 specifies user-defined event processing procedures pertaining to termination events. Similarly, the run-time environment sub-model 518 for the control flow model 504, synchronous condition model 506, and asynchronous condition model 508 specify user-defined event processing procedures pertaining to control flow events, synchronous condition events, and asynchronous condition events, respectively.

According to the present invention, users are provided with the ability to specify the manner in which events are processed on a stack frame by stack frame basis. Referring to the stack frame 302 in FIG. 3, for example, a user is provided with the ability to specify a first event handler for the COBOL stack frame 306, a second event handler for the PL/I stack frame 308, and a third event handler for the C stack frame 310, wherein the first, second, and third event handlers operate to process a particular event. If this particular event is detected during the operation of the COBOL routine 128 corresponding to the COBOL stack frame 306, then the first event handler is used to process the event. Similar, the second and the third event handlers are used to process the event if the event is detected during the operation of the PL/I routine 130 and the C routine 132, respectively.

The user-defined event processing procedures as encapsulated in the run-time environment sub-model 518 preferably utilize services provided by the run-time environment 122 and the operating system 120 to process events. In other words, user-defined event handlers preferably include function calls to functions which invoke services provided by the run-time environment 122 and the operating system 120 (such functions being provided by the run-time environment 122).

The language specific sub-model 516 for each primary model 504, 506, 508, and 510 specifies language specific event processing procedures that are defined by programming languages. Specifically, the language specific sub-model 516 for the termination model 510 specifies language specific event processing procedures pertaining to termination events. Similarly, the language specific sub-models 516 for the control flow model 504, synchronous condition model 506, and asynchronous condition model 508 specify language specific event processing procedures pertaining to control flow events, synchronous condition events, and asynchronous condition events, respectively.

According to the present invention, when a routine detects an event, the event is processed according to an applicable language specific event processing procedure (if any) from the applicable language specific sub-model 516 (for example, if the event is an asynchronous condition event, then the applicable language specific sub-model 516 is that which is associated with the asynchronous condition model 508). Referring to FIG. 2, for example, if the PL/I routine 130 detects an event, then an applicable PL/I specific event processing procedure (if any) defined by the applicable language specific sub-model 516 is used to process the event. Note, however, that processing of events according to the language specific procedures contained in the language specific sub-model 516 is subject to any applicable user-defined procedures contained in the run-time environment sub-model 518. This is described further below.

The characteristics of the language specific procedures contained in the language specific sub-model 516 shall now be described. As is well known, programming languages often define the manner in which events should be processed (although any particular programming language most likely defines event processing procedures for only a subset of all possible events). Such language specific event processing procedures are typically defined in computer programming language standards, which specify the syntax and operation of computer programming languages. Various well known computer programming language standards exist, such as the ANSI and ISO standards for the C, COBOL, Fortran, and PL/I computer programming languages. These computer programming language standards are described in many publicly available documents. Thus, details of language specific event processing procedures (which are encapsulated within the language specific sub-model 516) will be apparent to persons skilled in the relevant art.

The default sub-model 514 for each primary model 504, 506, 508, and 510 specifies default event processing procedures. Specifically, the default sub-model 514 for the termination model 510 specifies default event processing procedures pertaining to termination events. Similarly, the default sub-models 514 for the control flow model 504, synchronous condition model 506, and asynchronous condition model 508 specify default event processing procedures pertaining to control flow events, synchronous condition events, and asynchronous condition events, respectively.

An event is processed according to the default sub-model 514 only if an applicable and appropriate event processing procedure is not specified by either the run-time environment sub-model 518 or the language specific sub-model 516.

Preferably, the default sub-model 514 for all primary models 504, 506, 508, and 510 implements a well known model associated with an existing computer language standard, although other procedures for any or all of the primary models 504, 506, 508, and 510 may alternatively be used to implement the default sub-model 514. For example, the use of the ANSI C global error table (GET) model to implement the default sub-model 514 works particularly well with the synchronous condition model 506, since ANSI C as modified by POSIX defines procedures for processing all synchronous events.

According to the present invention, users may modify and/or augment the default sub-model 514 to accommodate their specific default run-time behavior preferences. User-accessible functions to modify the default sub-model 514 for each of the primary models 504, 506, 508, and 510 is provided by the run-time environment 122.

The manner in which the termination model 510, control flow model 504, a synchronous condition model 506, and asynchronous condition model 508 (as well as the default sub-model 514, language specific sub-model 516, and run-time environment sub-model 518 contained in each of these primary models) are applied to process events is discussed in greater detail below.

5. Structure of the Event Manager

Figure 6:
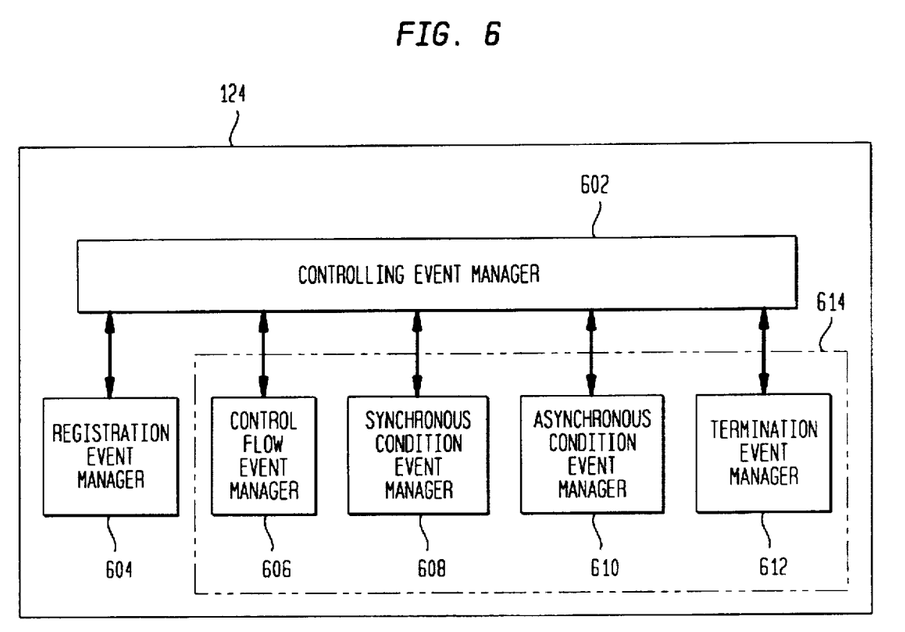
FIG. 6 is a block diagram of an event manager according to a preferred embodiment of the present invention.

FIG. 6 is a block diagram of the event manager 124. The event manager 124 includes a controlling event manager 602 which receives all event tokens (which represent events, as discussed above) and controls the dispatching of these event tokens to event processing managers 614 for processing of the events represented by the event tokens. Such event processing managers 614 include a control flow event manager 606, a synchronous condition event manager 608, an asynchronous condition event manager 610, and a termination event manager 612.

The control flow event manager 606 implements the control flow model 504 and is used to process control flow events. The synchronous condition event manager 608 implements the synchronous condition model 506 and is used to process asynchronous condition events. The asynchronous condition event manager 610 implements the asynchronous condition model 508 and is used to process asynchronous condition events. The termination event manager 612 implements the termination model 510 and is used to process termination events.

The event manager 124 also includes a registration event manager 604 which operates to register all event processing activities. Such event processing activities include registration of stack frames in the invocation stack with the controlling event manager 602, and registering event processing entities (such as user-defined event handlers) to thereby establish a chain of event handling services associated with a thread.

The controlling event manager 602, control flow event manager 606, synchronous condition event manager 608, a synchronous condition event manager 610, termination event manager 612, and registration event manager 604 are described in greater detail below.

6. Operation of the Event Manager

The operation of the present invention shall now be described with reference to a flowchart 702 shown in FIG. 7, which is of sufficient detail to enable one skilled in the relevant art to generate a computer program or a computer program product in accordance with the present invention. The steps of flowchart 702 are performed on a per event basis. That is, the steps of flowchart 702 are performed for each event to process each event. In flowchart 702, control begins at step 704 and immediately passes to step 706.

In step 706, an event is detected. Detection of events is well known. For example, a routine may become aware of an event (that is, may detect the event) by interrupting the routine.

The event may be detected in step 706 by a routine associated with a thread, for example. Consider, for example, the function invocation sequence 202 shown in FIG. 2. In step 706, the C routine 132 which is part of thread 204 may have detected an event. It is noted that the example function invocation sequence 202 in FIG. 2 and the corresponding invocation stack 302 in FIG. 3 are used herein to describe the operation of flowchart 702.

Also in step 706, after an event is detected, then an event token is generated. The event token is preferably generated by invoking an appropriate function provided by the run-time environment 122 (as discussed above), and preferably has the form shown in FIGS. 4A and 4B (as also described above). The event token is generated by the entity which detected the event (such as the C routine 132 in the above example).

Further in step 706, after the event token is generated, the event token is sent to the event manager 124. Specifically, the event token is sent to the controlling event manager 602 of the event manager 124 (see FIG. 6).

The event token is preferably sent to the controlling event manager 602 by invoking an appropriate function provided by the run-time environment 122 (as discussed above).

After receiving the event token, the controlling event manager 602 in step 708 determines the class of the event represented by the event token. Preferably, the controlling event manager 602 performs step 708 by referring to the information contained in the event identifier field 404 of the event token (see FIG. 4). The event identifier field 404 is described above.

After determining the class of the event represented by the event token, the controlling event manager 602 in step 710 selects one of the event processing managers 614 to process the event, and then passes the event token to the selected event processing manager 614. Specifically, if in step 708 it was determined that the event is a termination event, then the controlling event manager 602 in step 710 selects the termination event manager 612 to process the event, and passes the event token to the termination event manager 612. Similarly, if in step 708 it was determined that the event is a control flow event, or a synchronous condition event, or an asynchronous condition event, then the controlling event manager 602 in step 710 selects the control flow event manager 606, the synchronous condition event manager 608, or the asynchronous condition event manager 610, respectively, to process the event, and passes the event token to that event processing manager 614 (that is, to either the control flow event manager 606, the a synchronous condition event manager 608, or the a synchronous condition event manager 610, respectively).

Steps 712, 714, 716, 718, 720, 722, and 724 represent the operation of the event processing manager 614 that was selected in step 710. For reference purposes, this event processing manager 614 is hereafter called the selected event processing manager 614. These steps 712, 714, 716, 718, 720, 722, and 724 shall now be described.

In step 712, the selected event processing manager 614 selects a stack frame from the active invocation stack. The "active invocation stack" is defined herein as being the invocation stack associated with the thread that contains the routine which detected the event. For example, if the C routine 132 in thread 204 (FIG. 2) detected the event, then the invocation stack 302 (FIG. 3) associated with the thread 204 represents the active invocation stack.

Referring again to FIG. 7, in the first iteration of the loop containing steps 712, 714, 718, and 722, the selected event processing manager 614 in step 712 selects the stack frame at the top of the active invocation stack. Thus, in the above example where the C routine 132 detected the event, the selected event processing manager 614 in step 712 selects the C routine stack frame 310, which is at the top of the active invocation stack 302 as indicated by the stack pointer 312.

According to the present invention, event processing procedures may be defined for and associated with the stack frames of the active invocation stack. These event processing procedures may be from the run-time environment sub-models and/or the language specific sub-models 516 of the primary models 504, 506, 508, 510. Additionally, the event processing procedures from the default sub-models 514 of the primary models 504, 506, 508, 510 are associated with the active invocation stack as a whole on a default basis (described below). Further, so that it can perform steps 714, 716, 718, 720, 722, and 724, it is necessary for the selected event processing manager 614 to be aware of all event processing procedures that have been defined for and associated with each stack frame of the active invocation stack.

Such definition and association of event processing procedures with the stack frames of the active invocation stack is implemented via a registration process. The registration process also operates to inform the selected event processing manager 614 of all event processing procedures that have been defined for and associated with each stack frame of the active invocation stack. The registration process is described in a section below.

Figure 7:
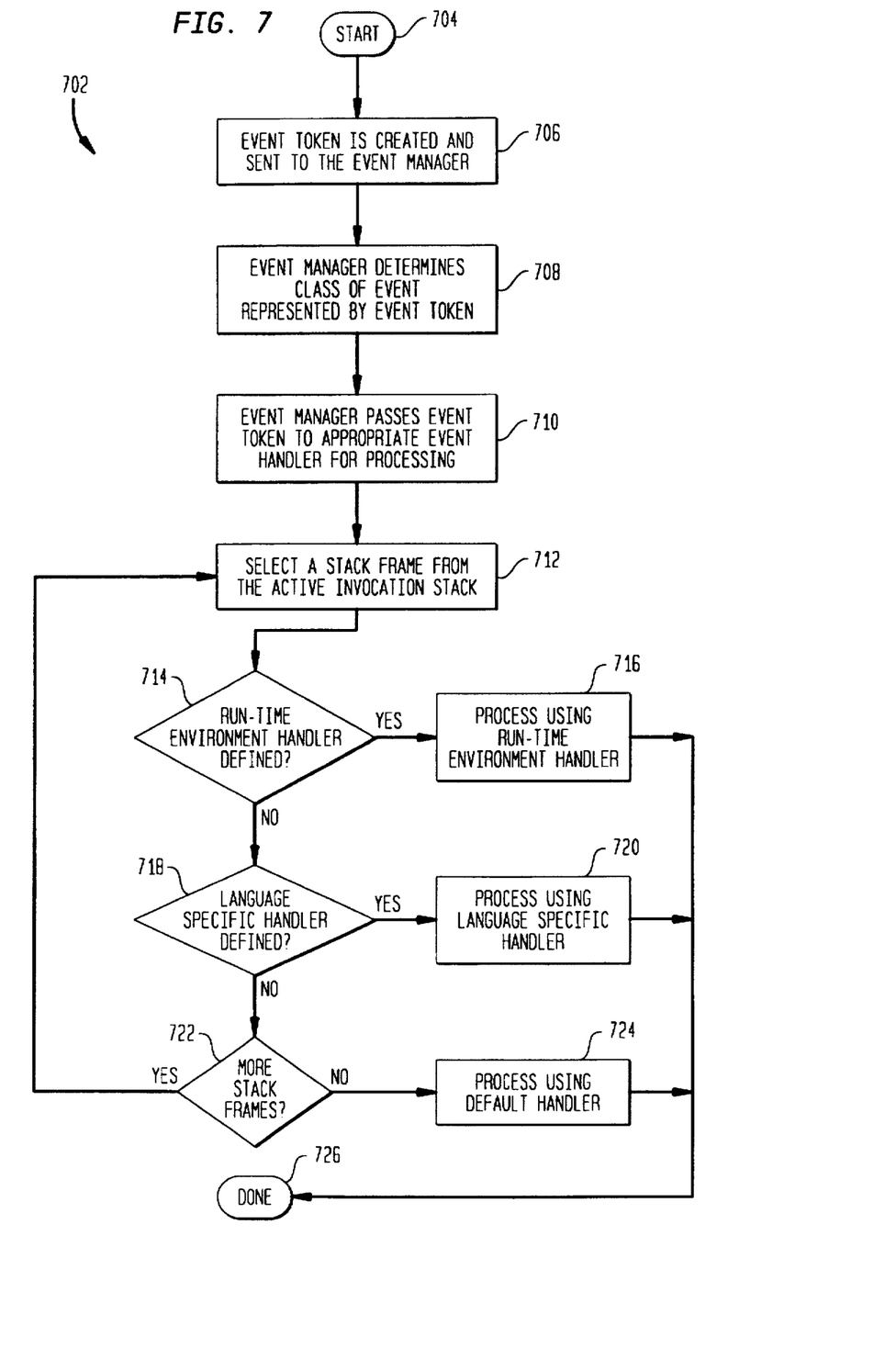
FIG. 7 is a flowchart depicting the manner in which the present invention processes events.

Continuing now with the discussion of flowchart 702 in FIG. 7, in step 714 the selected event processing manager 614 determines whether event processing procedures (such as a user-defined event handler) from the appropriate run-time environment sub-model 518 have been defined for the stack frame selected in step 712. The "appropriate run-time environment sub-model 518" is the run-time environment sub-model 518 associated with the selected event processing manager 614. For example, if the termination event manager 612 was selected in step 710 (such that the termination event manager 612 is the selected event processing manager 614), then the run-time environment sub-model 518 associated with the termination event manager 612 represents the "appropriate run-time environment sub-model 518".

If such event processing procedures from the appropriate run-time environment sub-model 518 have been defined for the stack frame selected in step 712, then in step 716 the selected event processing manager 614 processes the event using those event processing procedures. Such processing may be performed using information contained in the event token, such as the event number 410 and information addressed by the qualifying data pointer 406 (discussed above). Processing of the event may be complete after the completion of step 716, as indicated by step 726, or it may proceed to the next alternative, step 718, at the discretion of the process utilized in step 716.

If event processing procedures from the appropriate run-time environment sub-model 518 have not been defined for the stack frame selected in step 712, or appropriate processing options have been indicated, then step 718 is performed. In step 718, the selected event processing manager 614 determines whether language specific event processing procedures from the appropriate language specific sub-model 516 (that is, the language specific sub-model 516 associated with the selected event processing manager 614) have been defined for the stack frame selected in step 712. If such event processing procedures from the appropriate language specific sub-model 516 have been defined for the stack frame selected in step 712, then in step 720 the selected event processing manager 614 processes the event using those language specific event processing procedures. Such processing may be performed using information contained in the event token, such as the event number 410 and information addressed by the qualifying data pointer 406 (discussed above). Processing of the event may be complete after the completion of step 720, as indicated by step 726.

If event processing procedures from the appropriate language specific sub-model 516 have not been defined for the stack frame selected in step 712 or the procedure directs continued processing to occur, then step 722 is performed. In step 722, the selected event processing manager 614 determines whether there are more stack frames in the active invocation stack to process. If there are more stack frames in the active invocation stack to process, then the selected event processing manager 614 processes step 712, wherein the next stack frame in the active invocation stack is selected for processing.

In the above example where the C routine 132 detected the event, during the second iteration of the loop containing steps 712, 714, 718, and 722, the selected event processing manager 614 in step 712 selects the PL/I routine stack frame 308, which is the next stack frame in the invocation stack 302. All of the stack frames in the invocation stack 302 have been processed after the COBOL routine stack frame 306 has been processed (which occurs during the third iteration of the loop containing steps 712, 714, 718, and 722).

If in step 722 the selected event processing manager 614 determines that there are no more stack frames in the active invocation stack to process, then step 724 is processed. In step 724, the selected event processing manager 614 processes the event using the default event processing procedures from the appropriate default sub-model 514 (that is, the default sub-model 514 associated with the selected event processing manager 614). Such processing may be performed using information contained in the event token, such as the event number 410 and information addressed by the qualifying data pointer 406 (discussed above). Processing of the event is complete after the completion of step 724, as indicated by step 726.

As evident from the above, the present invention considers a number of factors when processing events. For example, the present invention processes events according to who the producer of the event is and who the consumer of the event is. In this context, the producer of the event is the routine which detected the event and which generated and sent the event token to the controlling event manager 602.

The consumer of the event is the routine whose semantics were used to process the event. For example, if the selected event processing manager 614 processed the event using either user-defined processing procedures (step 716) or language specific processing procedures (720) associated with the PL/I routine stack frame 308, then the PL/I routine 130 associated with the PL/I routine stack frame 308 is the to be the consumer of the event.

The present invention also processes events using event processing procedures defined by the run-time environment 122 (that is, user-defined event handlers in the run-time environment sub-model 518) and language specific processing procedures (defined by the language specific sub-model 516). Additionally, the present invention processes events using default processing procedures when event processing procedures are not defined by either the appropriate run-time environment sub-model 518 or the appropriate language specific sub-model 516.

As a result, the present invention provides a mechanism by which events resulting from program execution may be processed in a common manner such that the run-time behavior of application programs is more reliable, predictable, and robust.

7. Registration

As discussed above, according to the present invention, event processing procedures may be defined for and associated with the stack frames of the active invocation stack. These event processing procedures may be from the run-time environment sub-models and/or the language specific sub-models 516 of the primary models 504, 506, 508, 510. Additionally, the event processing procedures from the default sub-models 514 of the primary models 504, 506, 508, 510 are associated with the active invocation stack as a whole on a default basis.

Further, so that it can perform steps 714, 716, 718, 720, 722, and 724, it is necessary for the selected event processing manager 614 to be aware of all event processing procedures that have been defined for and associated with each stack frame of the active invocation stack. Such awareness on the part of the selected event processing manager 614 is necessary so that the selected event processing manager 614 can utilize these event processing procedures to process events (as discussed above).

Such definition and association of event processing procedures with the stack frames of the active invocation stack is implemented via a registration process. The registration process also operates to inform the selected event processing manager 614 (and, in fact, to inform the entire event manager 124) of all event processing procedures that have been defined for and associated with various stack frames of the active invocation stack (i.e., those stack frames that have registered). The registration process shall now be described.

According to the present invention, various stack frames in every invocation stack will register with the controlling event manager 602 (such registration can be performed at any time, such as when a stack frame is created by code generated with enabled compilers or through the use of callable services). Only those stack frames which intend to be involved with processing events need to register. Such registration must inform the controlling event manager 602 of the existence of the stack frame, and any user-defined event handlers (from the run-time environment sub-models 518) and language specific event processing procedures (from the language specific sub-models 516) that are to be associated with the stack frame. In this manner, the registration process provides a link between stack frames and user-defined event handlers and language specific event processing procedures.

Preferably, registration is performed by generating and sending a registration event to the registration event manager 604 using functions provided by the run-time environment 122 for enabled compilers, but registration may be accomplished through callable services also. These registration events are of the form shown in FIGS. 4A and 4B.

Information pertaining to any user-defined event handlers and language specific event processing procedures is preferably stored in a data block that is addressed by the qualifying data pointer 406 in each registration event. The registration event manager 604 receives and conveys the information contained in the registration events to the controlling event manager 602. In this manner, the controlling event manager 602 (and, in fact, the entire event manager 124) is made aware of all event processing procedures from the language specific sub-models 516 and the run-time environment sub-models 518 that have been defined for and associated with each stack frame of the active invocation stack.

Each time that a stack frame is registered with the registration event manager 604, the registration event manager 604 determines whether or not this is the first stack frame of the invocation stack in question to be registered. If this is the first stack frame, then the registration event manager 604 associates the default sub-models 514 for the primary models 504, 506, 508, 510 with the invocation stack in question. The registration event manager 604 conveys this information to the controlling event manager 602. In this manner, the controlling event manager 602 (and, in fact, the entire event manager 124) is made aware of all event processing procedures from the default sub-models 514 that have been associated with the invocation stack in question.

While the invention has been particularly shown and described with reference to preferred embodiments thereof, it will be understood by those skilled in the art that the foregoing and other changes in form and details may be made therein without departing from the spirit and scope of the invention.

Having thus described our invention, what we claim as new and desire to secure by Letters Patent is:

1. A method of dynamically processing an event signifying a condition in a computer system, an invocation stack being maintained in said computer system, said invocation stack comprising a plurality of stack frames, the method comprising the steps of:

(1) selecting a condition event processing manager to process said event based upon an event token representing an event from a routine of the computer system, the event token containing information identifying and otherwise pertaining to the event;

(2) selecting a stack frame from said invocation stack in response to said event, wherein the run-time occurrence of said event is substantially unpredictable;

(3) determining whether a run-time event processing sub-manager associated with said selected condition event processing manager, and including user-defined event processing procedures for said event condition, has been registered with said selected stack frame;

(4) processing said event using said run-time event processing sub-manager if said run-time event processing sub-manager has been so registered;

(5) if a run-time event processing sub-manager for said event condition has not been registered with said selected stack frame, then determining whether a language specific event processing sub-manager associated with said selected condition event processing manager, and including event processing procedures defined by programming procedures for said event condition, has been registered with said selected stack frame; and (6) processing said event using said language specific event processing sub-manager if said language specific event processing sub-manager has been so registered.

2. The method of claim 1, further comprising the steps of:

(7) if a language specific event processing sub-manager for said event condition has not been registered with said selected stack frame, then selecting another stack frame from said invocation stack; and (8) repeating steps (3)–(7) until one of condition (i) and condition (ii) occurs:

condition (i): all stack frames in said invocation stack have been selected; and condition (ii): said event has been processed.

3. The method of claim 2, further comprising the step of:

(9) processing said event using a default event processing sub-manager associated with said selected condition event processing manager, and including default procedures for processing said event, if a run-time event processing sub-manager for said event condition and a language specific event processing sub-manager for said event condition have not been registered with any stack frame of said invocation stack.

4. The method of claim 1 in which an execution entity executes in said computer system, said execution entity comprising a plurality of computer language and programming paradigm diverse routines, said invocation stack being used by said execution entity during execution of said execution entity in said computer system, the method also comprising the following steps which are performed prior to step (1):

(a) detecting said event by a routine of said execution entity; and (b) generating an event token that is intelligible to all routines of said execution entity, said event token containing information identifying and otherwise pertaining to said event;

wherein steps (3)–(6) are performed using said information contained in said event token.

5. The method of claim 4, wherein step (b) comprises the steps of:

generating event identification information identifying a type of said event;

generating event qualifying information specific to said event; and combining said event identification information and said event qualifying information to thereby generate said event token.

6. An event manager for dynamically processing an event signifying a condition in a computer system, an invocation stack being maintained in said computer system, said invocation stack comprising a plurality of stack frames, an execution entity executing in said computer system, said execution entity comprising a plurality of computer language and programming paradigm diverse routines, said invocation stack being used by said execution entity during execution of said execution entity in said computer system, said event manager comprising:

a plurality of condition event processing managers each for processing events of a particular event type, wherein the run-time occurrence of each of said events is substantially unpredictable; and a controlling event manager comprising:

means for receiving an event token representing an event from one of the routines of said execution entity, said event token being intelligible to all routines of said execution entity, said event token containing information identifying and otherwise pertaining to said event, means for referring to said information contained in said event token to identify an event type of said event, means for selecting one of said event processing managers in accordance with said identified event type as represented by a received event token, and means for enabling said selected event processing manager to process said event;

wherein said selected condition event processing manager comprises:

a plurality of event processing sub-managers, each said event processing sub-manager specifying procedures for processing said events of a particular event type, said sub-managers including a language specific event processing sub-manager comprising event processing procedures defined by programming procedures and a run-time event processing sub-manager comprising user-defined event processing procedures, means for selecting a stack frame from said invocation stack, means for determining whether said run-time event processing sub-manager for said event condition has been registered with said selected stack frame, and means for processing said event using said run-time event processing sub-manager if said run-time event processing sub-manager has been so registered, means for determining whether said language specific event processing sub-manager for said event condition has been registered with said selected stack frame if a run-time event processing sub-manager for said event condition has not been registered with said selected stack frame, and means for processing said event using said language specific event processing sub-manager if said language specific event processing sub-manager has been so registered.

7. The event manager of claim 6, wherein said event processing sub-managers of said selected event processing manager further comprises:

a default event processing sub-manager comprising default procedures for processing an event if a run-time event processing sub-manager for said event condition and a language specific event processing sub-manager for said event condition have not been registered with any stack frame of said invocation stack.

8. The event manager of claim 6, further comprising means for enabling said one of said routines of said execution entity to generate said event token, and to transfer said event token to said controlling event manager.

9. The event manager of claim 6, wherein said event token comprises an event identifier field to store event identification information identifying a type of an event, and a qualifying data pointer field for storing an address of a data block containing event qualifying information specific to an event occurrence.

10. The event manager of claim 6, wherein said plurality of event processing managers comprises:

a control flow event manager to process control flow events;

a synchronous condition event manager to process synchronous condition events;

an asynchronous condition event manager to process asynchronous condition events; and a termination event manager to process termination events.

11. The event manager of claim 6, further comprising a registration event manager to enable registration of event handling procedures with said stack frames of said invocation stack, said registration event manager comprising:

means for receiving registration event tokens, said registration event tokens being intelligible to all routines of said execution entity, said event tokens containing registration information pertaining to registering run-time event processing sub-managers and language specific event processing sub-managers with stack frames of said invocation stack; and     means for registering run-time event processing sub-managers and language specific event processing sub-managers with stack frames of said invocation stack in accordance with said registration information.

12. An event manager, comprising:

a controlling event manager for receiving tokens representative of events and for controlling dispatching of the tokens for processing, wherein each event token contains information identifying and otherwise pertaining to an event;

a registration event manager for registering event processing activities; and     a plurality of selectable condition event processing managers, each said event processing manager processing a distinct type of event;

wherein at least one of said selectable condition event processing managers comprises a plurality of event processing sub-managers, each said sub-manager comprising procedures for processing said distinct type of event;

wherein a particular selectable condition event processing manager is selected for processing an event based upon a token associated with the event.

13. The event manager of claim 12, wherein said plurality of selectable condition event processing managers comprise:

a control flow event manager to process control flow events;

a synchronous condition event manager to process synchronous condition events;

an asynchronous condition event manager to process asynchronous condition events; and     a termination event manager to process termination events.

14. The event manager of claim 12, wherein one of said event processing sub-managers is a run-time environment sub-manager comprising user-defined event processing procedures.

15. The event manager of claim 12, wherein one of said event processing sub-managers is a language specific event processing sub-manager comprising event processing procedures defined by programming procedures.

16. The event manager of claim 12, wherein one of said event processing sub-managers is a default event processing sub-manager comprising default event processing procedures.

17. A program storage device readable by a computer system, tangibly embodying a program of instructions executable by said computer system to perform method steps for enabling said computer system to process an event signifying a condition in said computer system, an invocation stack being maintained in said computer system, said invocation stack comprising a plurality of stack frames, said method steps comprising:

(1) selecting a condition event processing manager to process said event based upon an event token representing an event from a routine of said computer system, the event token containing information identifying and otherwise pertaining to the event;

(2) selecting a stack frame from said invocation stack in response to said event, wherein the run-time occurrence of said event is substantially unpredictable;

(3) determining whether a run-time event processing sub-manager associated with said selected condition event processing manager, and including user-defined event processing procedures for said event condition, has been registered with said selected stack frame;

(4) processing said event using said run-time event processing sub-manager if said run-time event processing sub-manager has been so registered;

(5) if a run-time event processing sub-manager for said event condition has not been registered with said selected stack frame, then determining whether a language specific event processing sub-manager associated with said selected condition event processing manager, and including event processing procedures, defined by programming procedures, for said event condition, has been registered with said selected stack frame; and     (6) processing said event using said language specific event processing sub-manager if said language specific event processing sub-manager has been so registered.

18. The program storage device of claim 17, further comprising the steps of:

(7) if a language specific event processing sub-manager for said event condition has not been registered with said selected stack frame, then selecting another stack frame from said invocation stack; and     (8) repeating steps (3)–(7) until one of condition (i) and condition (ii) occurs:

condition (i): all stack frames in said invocation stack have been selected; and         condition (ii): said event has been processed.

19. The program storage device of claim 18, further comprising the step of:

(9) processing said event using an applicable default event processing sub-manager associated with said selected condition event processing manager, and including default procedures for processing an event, if a run-time event processing sub-manager for said event condition and a language specific event processing sub-manager for said event condition have not been registered with any stack frame of said invocation stack.

20. The program storage device of claim 17 in which an execution entity executes in said computer system, said execution entity comprising a plurality of computer language and programming paradigm diverse routines, said invocation stack being used by said execution entity during execution of said execution entity in said computer system, the method also comprising the following steps which are performed prior to step (1):

(a) detecting said event by a routine of said execution entity; and     (b) generating an event token that is intelligible to all routines of said execution entity, said event token containing information identifying and otherwise pertaining to said event;

wherein steps (3)–(6) are performed using said information contained in said event token.

21. The program storage device of claim 20, wherein step (b) comprises the steps of:

generating event identification information identifying a type of said event;

generating event qualifying information specific to said event; and combining said event identification information and said event qualifying information to thereby generate said event token.

22. A computer program product for use with an invocation stack, the invocation stack comprising a plurality of stack frames, said computer program product comprising:

a computer usable medium having a computer readable program code means embodied in said medium for enabling a computer to process an event signifying a condition in said computer, said computer readable program code means comprising:

computer readable first program code means for enabling said computer to select a condition event processing manager to process said event based upon an event token representing an event from a routine of said computer, the event token containing information identifying and otherwise pertaining to the event;

computer readable second program code means for enabling said computer to select a stack frame from said invocation stack in response to said event wherein the run-time occurrence of said event is substantially unpredictable;

computer readable third program code means for enabling said computer to determine whether a run-time event processing sub-manager associated with said selected condition event processing manager, and including user-defined event processing procedures for said event condition, has been registered with said selected stack frame;

computer readable fourth program code means for enabling said computer to process said event using said run-time event processing sub-manager if said run-time event processing procedure has been so registered;

computer readable fifth program code means for enabling said computer to determine whether a language specific event processing sub-manager associated with said selected condition event processing manager, and including event processing procedures, defined by programming procedures, for said event condition, has been registered with said selected stack frame when a run-time event processing sub-manager for said event condition has not been registered with said selected stack frame; and computer readable sixth program code means for enabling said computer to process said event using said language specific event processing sub-manager if said language specific event processing sub-manager has been so registered.

23. The computer program product of claim 22, further comprising:

computer readable seventh program code means for enabling said computer to process said event using an applicable default event processing sub-manager associated with said selected condition event processing manager, and including default procedures for processing said event, if a run-time event processing sub-manager for said event condition and a language specific event processing sub-manager for said event condition have not been registered with any stack frame of said invocation stack.

24. The computer program product of claim 23, wherein an execution entity executes in said computer, said execution entity comprising a plurality of computer language and programming paradigm diverse routines, said invocation stack being used by said execution entity during execution of said execution entity in said computer, the computer program product also comprising:

computer readable eighth program code means for enabling said computer to enable a routine of said execution entity to detect said event; and computer readable ninth program code means for enabling said computer to generate an event token that is intelligible to all routines of said execution entity, said event token containing information identifying and otherwise pertaining to said event;

wherein said computer readable third program code means, said computer readable fourth program code means, said computer readable fifth program code means, and said computer readable sixth program code means operate using said information contained in said event token.

25. The computer program product of claim 24, wherein said computer readable ninth program code means comprises:

computer readable tenth program code means for enabling said computer to generate event identification information identifying a type of said event;

computer readable eleventh program code means for enabling said computer to generate event qualifying information specific to said event; and computer readable twelfth program code means for enabling said computer to combine said event identification information and said event qualifying information to thereby generate said event token.

* * * * *